(12) United States Patent  
Richardson

(10) Patent No.: US 8,333,276 B2  
(45) Date of Patent: Dec. 18, 2012

(54) MECHANISM FOR ENABLING APPLICATION OF INFORMATION TO AN OBJECT

(76) Inventor: Craig A. Richardson, Troy, MI (US)

( * ) Notice: Subject to any disclaimer, the term of this patent is extended or adjusted under 35 U.S.C. 154(b) by 714 days.

(21) Appl. No.: 12/284,003

(22) Filed: Sep. 17, 2008

(65) Prior Publication Data

US 2009/0152142 A1   Jun. 18, 2009

Related U.S. Application Data

(63) Continuation-in-part of application No. 11/141,626, filed on May 31, 2005, now abandoned.

(60) Provisional application No. 60/576,761, filed on Jun. 3, 2004.

(51) Int. Cl.
   *B65D 85/57* (2006.01)
(52) U.S. Cl. .................... 206/308.1; 206/459.5; 220/812
(58) Field of Classification Search .................. 220/811, 220/812, 813, 815, 816; 206/307.1, 308.1, 206/311, 312, 313, 459.5
   See application file for complete search history.

(56) References Cited

U.S. PATENT DOCUMENTS

| | | | | |
|---|---|---|---|---|
| 391,145 A * | 10/1888 | Hardin | | 229/125.11 |
| 1,594,437 A * | 8/1926 | Walsh | | 220/813 |
| 1,997,043 A * | 4/1935 | Clark | | 206/246 |
| 2,357,214 A * | 8/1944 | McDole | | 312/235.4 |
| 2,791,348 A * | 5/1957 | Adams | | 220/812 |
| 2,850,760 A * | 9/1958 | Vanderwalker | | 16/360 |
| 3,422,988 A * | 1/1969 | LaFranca | | 221/58 |
| 4,420,079 A * | 12/1983 | Gliniorz et al. | | 206/408 |
| 4,496,050 A * | 1/1985 | Kirchner et al. | | 206/753 |
| 4,615,461 A * | 10/1986 | Liu | | 220/815 |
| 5,188,228 A * | 2/1993 | Barrett | | 206/308.1 |
| 5,203,469 A * | 4/1993 | Chang et al. | | 220/812 |
| 5,253,756 A * | 10/1993 | Goekler | | 206/307.1 |
| 5,263,580 A * | 11/1993 | Ciba et al. | | 206/308.1 |
| 5,549,199 A * | 8/1996 | Lindsay | | 206/308.1 |
| 5,682,989 A * | 11/1997 | Taniyama | | 206/308.1 |
| 6,283,284 B1 * | 9/2001 | Crane et al. | | 206/310 |
| 6,450,332 B1 * | 9/2002 | Courchesne | | 206/308.1 |
| 6,516,852 B1 * | 2/2003 | Sandor | | 156/391 |
| 6,659,272 B2 * | 12/2003 | Bellin et al. | | 206/232 |
| 6,669,023 B2 * | 12/2003 | Kikuchi et al. | | 206/759 |
| 6,749,079 B2 * | 6/2004 | Katagiri et al. | | 220/345.2 |
| 7,055,688 B2 * | 6/2006 | Watson et al. | | 206/308.1 |
| 2002/0179487 A1 * | 12/2002 | Au et al. | | 206/752 |
| 2010/0078437 A1 | 4/2010 | Valley, III et al. | | 220/507 |

* cited by examiner

*Primary Examiner* — Jacob K Ackun

(57) ABSTRACT

A mechanism for enabling application of information to an object. The mechanism includes a base portion and a panel operatively coupled to the base portion. The panel has a first surface for application of information thereon. An interface operatively couples the panel to the base portion such that the first surface is positionable and maintainable in a first angular orientation and in a second angular orientation different from the first angular orientation.

20 Claims, 6 Drawing Sheets

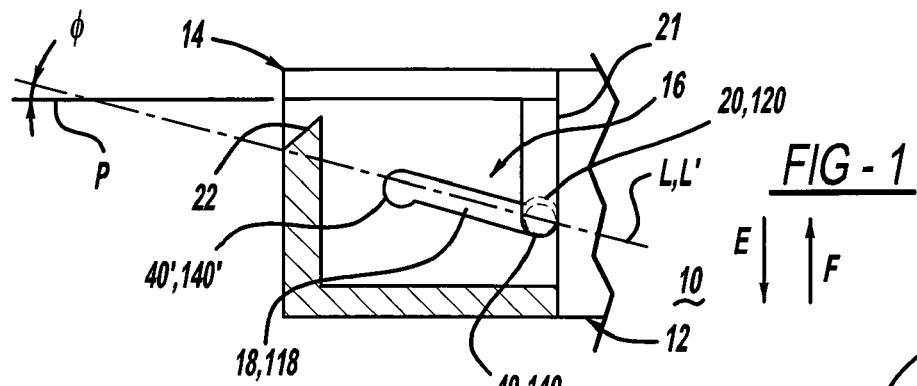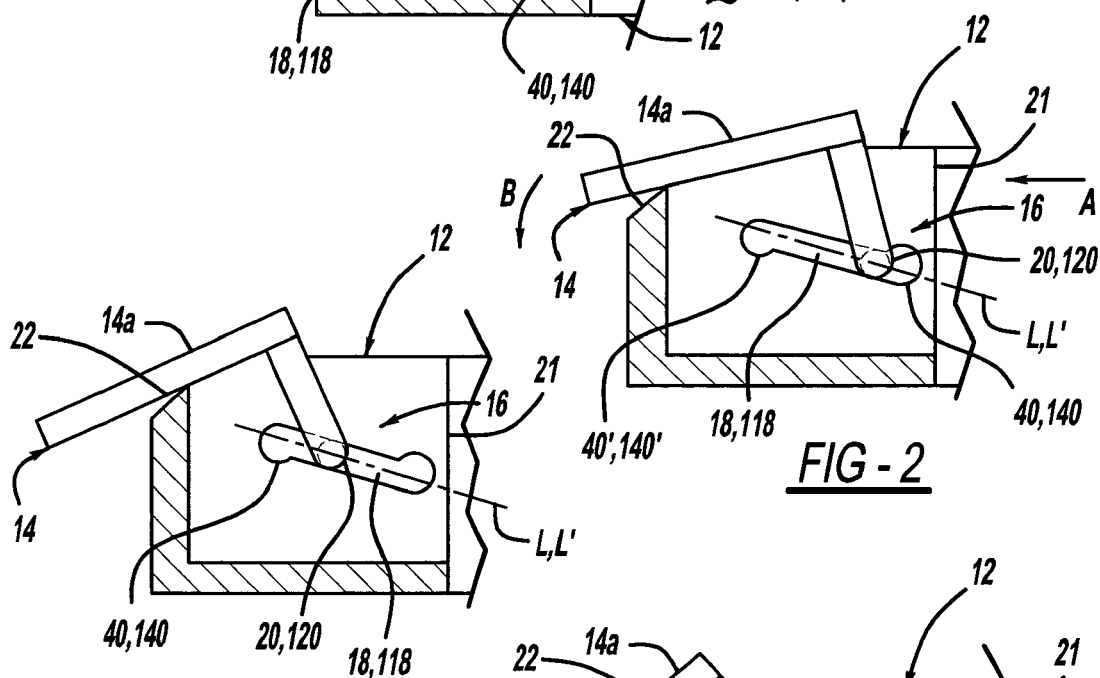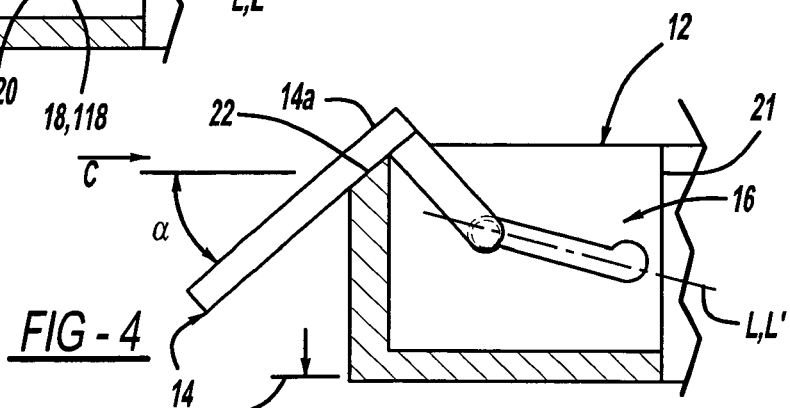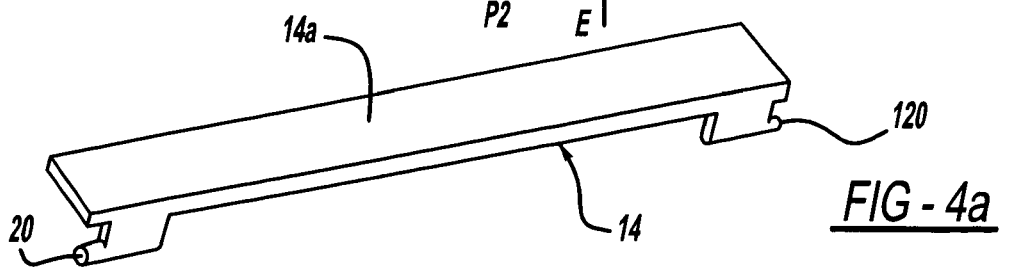

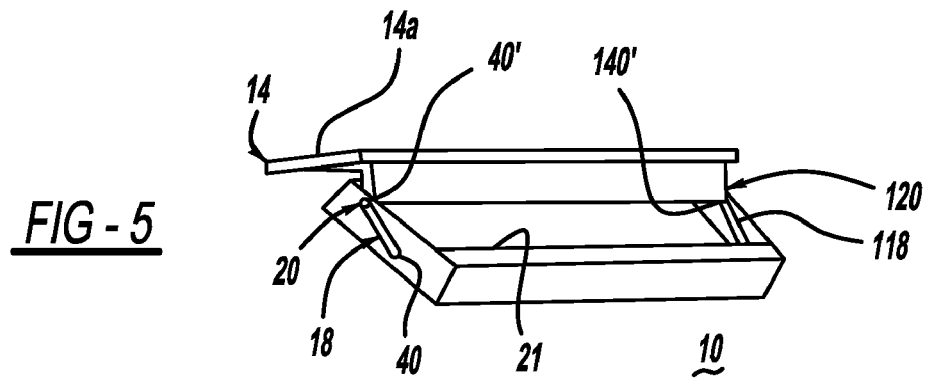
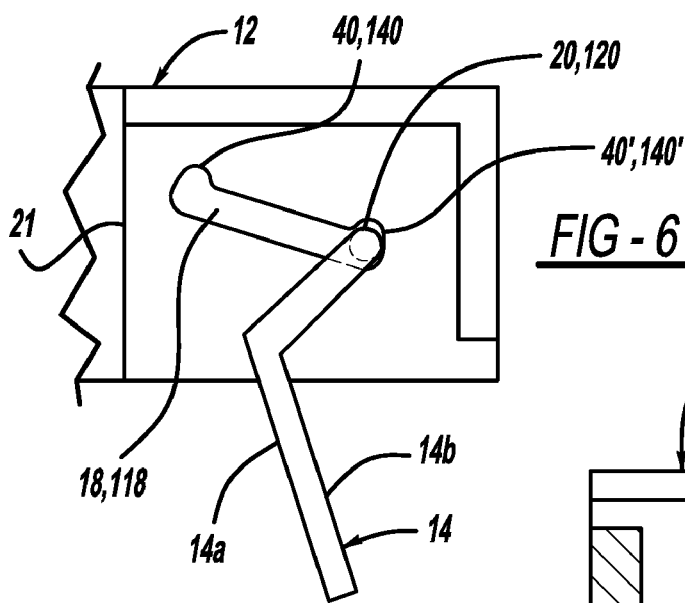
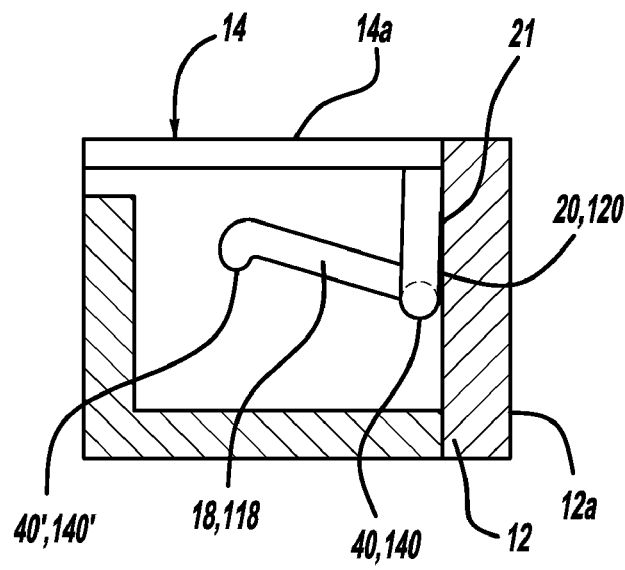
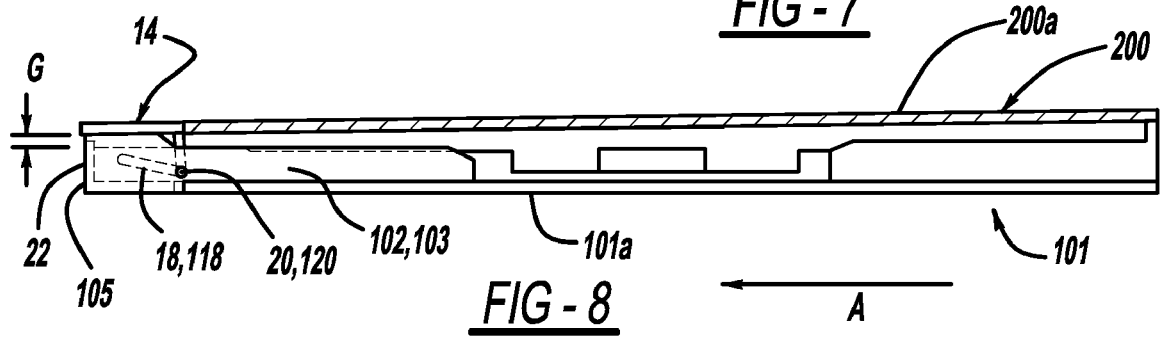

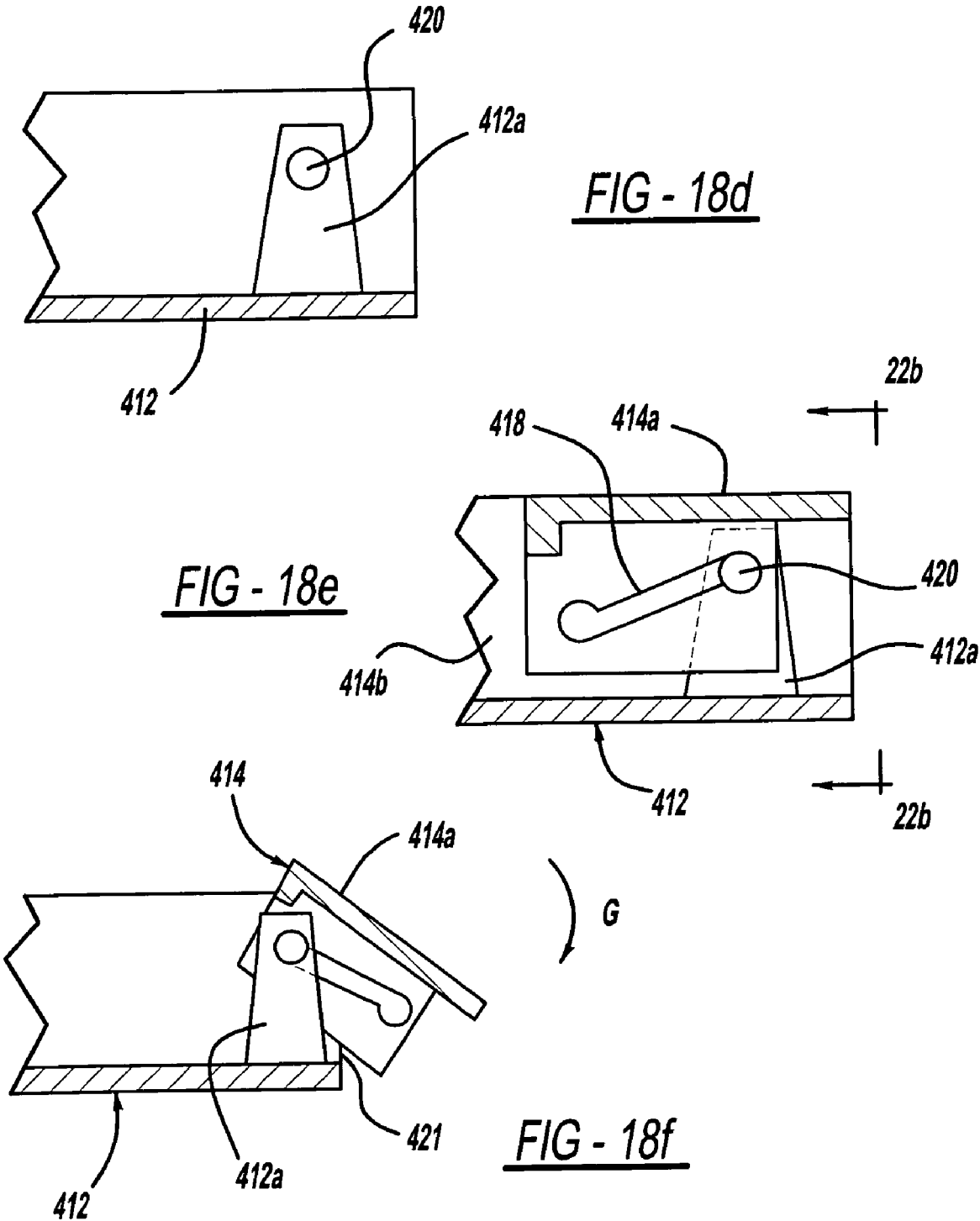

MECHANISM FOR ENABLING APPLICATION OF INFORMATION TO AN OBJECT

CROSS-REFERENCE TO RELATED APPLICATIONS

This application is a continuation-in-part of U.S. application Ser. No. 11/141,626, filed on May 31, 2005, now abandoned which claims the benefit of U.S. Provisional Application No. 60/576,761 filed on Jun. 3, 2004. These prior applications are incorporated herein by reference.

BACKGROUND OF THE INVENTION

The embodiments of the invention disclosed herein relate to mechanisms for enabling application of information (for example, as contained on a label) to an object.

It is frequently necessary to apply identifying information to objects such as bins and drawers used for the storage of parts, tooling, fasteners, and other types of hardware, and also to other types of storage containers. Some problems with existing methods for applying information to such objects include an inability to orient the surface to which the information is applied, to enable viewing of the applied information from various locations or positions. In addition, constraints on the size of the surface to which the information is applied may correspondingly restrict the size of any text printed on the surface and the ability of the text to be read.

One product exemplifying such concerns is a case used for holding, protecting and identifying compact discs, digital videodiscs, and mini-discs. Such cases have been in existence in various forms since the "disc" media storage format came into public use, and are well-known in the art. The basic case design incorporates a tray base into which a disc tray is placed for the purpose of holding the disc, and a hinged cover that pivots with respect to the tray base to enclose the tray. Information identifying the disc contents may be applied to a flap attached to an inside of the case cover. The case also has a "spine label" area along which information identifying the disc and/or its contents may be placed. These cases are frequently stacked so that the only portion of the case visible from the stack is the spine label area. In the event that multiple discs are stacked on top of one another, information applied to the spine label area is used to identify contents of the disc without removing the disc from the stack to expose its cover.

However, due to the small depth of the case, the spine label area on which identifying information may be applied is only approximately ¼ inch in height. This severely restricts the size and visibility of any printed information appearing on the spine label area. Identification of the content of stacked cases using information appearing on the "spine area" may be very difficult beyond a certain distance, even for people with normal vision. For people with a vision impairment, such identification may become almost impossible.

In addition, depending on the type of information stored on the disc, an inability to rapidly identify the contents of a particular disc could be costly in terms of lost time and/or revenue. Also, under certain circumstances, such an inability to rapidly identify the case contents could be life-threatening. For example, an instance may arise where vital medical information stored on a server suddenly becomes unavailable due to a system crash, and backup hard storage media (such as a CD-ROM) must be consulted in an emergency situation. In this instance, rapid identification of the information stored on the storage media becomes essential.

Currently, without physically handling the case to read the ¼ inch spine label area, exposing the complete case to look at the cover information, or opening the case and removing the disc, there is no easy way to identify the contents. This is inconvenient, time consuming, and frustrating to someone attempting to ascertain the contents of the disc.

Thus, a need exists for an information application mechanism which addresses such concerns.

SUMMARY OF THE INVENTION

In accordance with embodiments of the present invention, a mechanism for enabling application of information to an object s provided. The mechanism includes a base portion and a panel operatively coupled to the base portion. The panel has a first surface for application of information thereon. An interface operatively couples the panel to the base portion such that the first surface is positionable and maintainable in a first angular orientation and in a second angular orientation different from the first angular orientation.

In another aspect of the embodiments of the invention, a mechanism for enabling application of information to an object is provided. The mechanism includes a base portion including a pair of opposed grooves formed thereon and a panel including a pair of protrusions formed thereon. The panel has a first surface for application of information thereto. Each protrusion of the pair of protrusions slidingly engages a respective one of the pair of opposed grooves. At least one bearing surface is operatively coupled to the base portion. Portions of the panel contact portions of the opposed grooves and the at least one bearing surface to position and maintain the first surface of the panel in a predetermined angular orientation.

In another aspect of the embodiments of the invention, a case for containing a media storage device therein is provided. The case includes a base portion and a panel operatively coupled to the base portion. The panel has a first surface for application of information thereon. An interface operatively couples the panel to the base portion such that the first surface is positionable and maintainable in a first position substantially coplanar with another surface of the case and in a second position wherein the first surface resides at an angle with respect to the other surface of the case.

BRIEF DESCRIPTION OF THE DRAWINGS

FIGS. 1-4 are partial cross-sectional views showing the structure and operation of a mechanism for enabling application of information to an object in accordance with one embodiment of the present invention.

FIG. 4a shows a panel incorporated into the embodiment of the mechanism shown in FIGS. 1-4.

FIG. 5 is a perspective view of the embodiment shown in FIGS. 1-4.

FIG. 6 is a partial cross-sectional view of a mechanism for enabling application of information to an object in accordance with another embodiment of the invention.

FIG. 7 is a partial cross-sectional view of a mechanism for enabling application of information to an object in accordance with another embodiment of the invention.

FIGS. 8-11 are side schematic views showing the embodiment of FIGS. 1-4a incorporated into a case for receiving a digital storage medium therein.

FIGS. 18a-18f show the structure and operation of another embodiment of a mechanism for enabling application of information to a object.

DETAILED DESCRIPTION

Figure 9:
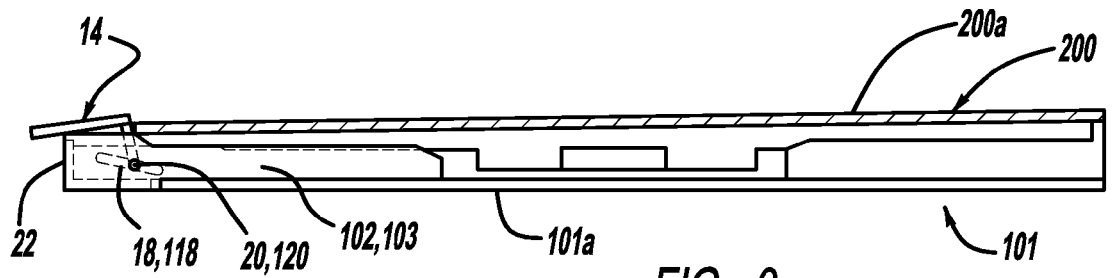
Figure 10:
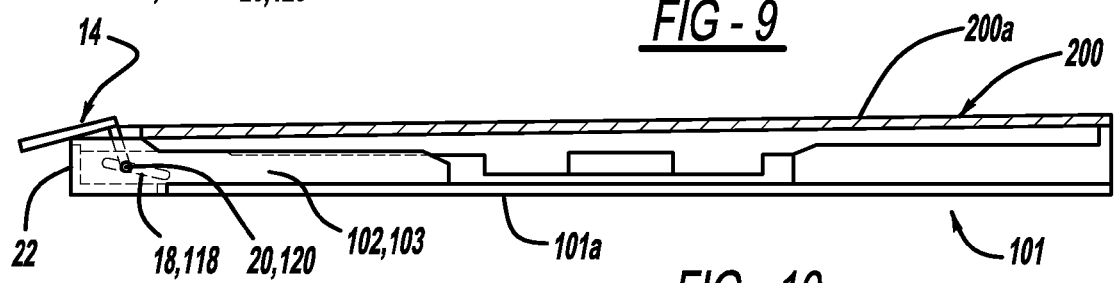
Figure 11:
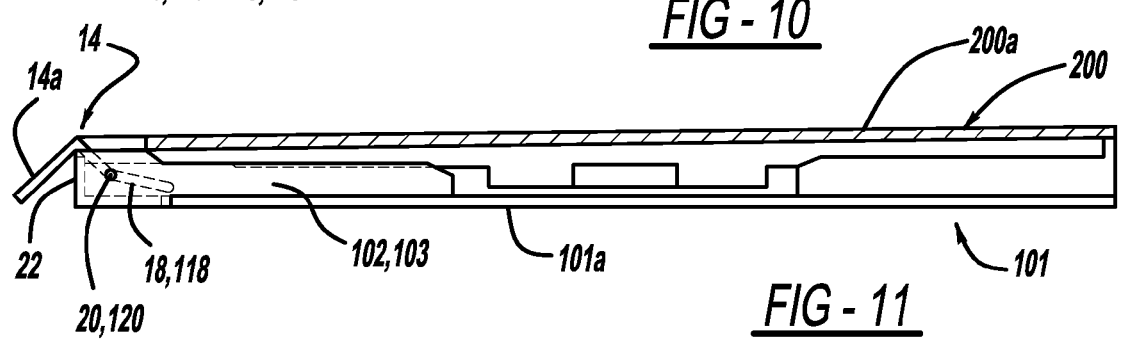

FIGS. 1-5 show one embodiment of a mechanism 10 for enabling application of information to an object. In the embodiment shown in FIGS. 1-5, mechanism 10 includes a base portion 12, a panel 14 operatively coupled to the base portion, and an interface, generally designated 16, for coupling the panel to the base portion. Panel 14 has a first surface 14a for applying of information thereon. Interface 16 couples panel 14 to base portion 12 such that first surface 14a is positionable and maintainable in a first position (shown in FIG. 1) and in a second position (shown in FIG. 4).

The embodiments of the mechanism described herein and/or elements thereof may be added to or retrofitted onto an existing object. Alternatively, an embodiment of the mechanism described herein or elements thereof may be designed into an object prior to its fabrication or manufacture.

Interface 16 generally includes any grooves, protrusions, bearing surfaces, engagement surfaces, and any other features described herein, formed either on the base portion or on the panel, which connect the various elements of the information application mechanism described, which guide or limit motion of the elements with respect to each other, and which otherwise enable positioning and securement of the various elements with respect to each other.

Base portion 12, panel 14, and elements of interface 16 may be formed from any suitable materials using any suitable methods, according to the requirements of a particular application. For example, such factors as the end use environment in which the elements of the mechanism will be used, the materials from which an object into which the mechanism is incorporated are formed, and/or any other pertinent design or manufacturing considerations may affect the choice of materials from which the mechanism elements are formed. Suitable materials may include various polymers, various metals or metal alloys, and other materials.

Information may be applied to first surface 14a using any of a variety of methods. For example, the information may be contained on a label which is adhesively, magnetically, or otherwise applied to surface 14a. Alternatively, the information may be written or printed directly on surface 14a. In yet another embodiment, the information is embossed onto or otherwise formed on the surface (for example, in the form of Braille characters). In addition, information may be applied to surface 14a using any other suitable means.

Referring to FIGS. 1-5, interface 16 generally includes at least one groove 18 formed in one of the base portion 12 and the panel 14, at least one protrusion 20 positioned on the other one of the base portion 12 and the panel 14, and at least one bearing surface 22 coupled to the base portion 12. During motion of the panel between the first angular orientation and the second angular orientation, the at least one protrusion 20 slidingly engages the at least one groove 18. In addition, a portion of the panel 14 abuts the bearing surface 22 when the first surface of the panel is in the second angular orientation.

Bearing surface 22 thus aids in positioning and securing the first surface in the second angular orientation. As used herein, the term "groove" may refer to a slot which extends completely through the part in which it is formed, or to a "blind" groove which extends into the part to some predetermined depth or depths.

Referring to FIGS. 1-5, in a particular embodiment, interface 16 includes a first groove 18 formed in one of the base portion 12 and the panel 14, and a first protrusion 20 positioned on the other one of the base portion 12 and the panel 14. First protrusion 20 is configured and dimensioned to slidingly engage first groove 18, to guide the motion of the protrusion along a path defined by the groove. Also, a second groove 118 is formed in one of base portion 12 and panel 14 opposite groove 18, and a second protrusion 120 is positioned on the other one of the base portion 12 and the panel 14 opposite protrusion 20. As seen in FIG. 5, grooves 18 and 118 are substantially in alignment with each other and protrusions 20 and 120 are substantially in alignment with each other. (It will be understood that grooves 18 and 118 and protrusions 20 and 120 are labeled as shown in FIGS. 1-4 because grooves 18 and 118 are in alignment with each other and protrusions 20 and 120 are in alignment with each other in the profile views shown in FIGS. 1-4. Thus, for example, protrusions 20 and 120 may be labeled "20, 120", where the first element number in the sequence refers to the element nearest a viewer of the drawing, and the second number in the sequence refers to the corresponding element farthest from the viewer). In the particular embodiment shown in FIGS. 1-5, both of grooves 18 and 118 reside on base portion 12, while the complementary protrusions 20 and 120 which engage the grooves are formed on panel 14.

A bearing surface 21 is formed along base portion 12. Bearing surface 21 and engagement between protrusions 20, 120 and grooves 18, 118 act to position and maintain first panel surface 14a in the first position.

As stated previously, the grooves may be formed into the base portion during fabrication of the base portion, the grooves may be formed in the base portion after formation of the base portion, or the grooves may be formed into separate parts which are then suitably secured to the base portion. It will also be realized that grooves 18 and 118 could alternatively be formed on panel 14 and protrusions 20 and 120 formed on base portion 12.

In the embodiment shown in FIGS. 1-5, it may be seen that, first surface 14a has a first angular orientation in the first position and a second angular orientation in the second position, the second angular orientation being different from the first angular orientation.

Grooves 18 and 118 have longitudinal axes L and L', respectively. As seen in FIG. 5, grooves 18 and 118 are also arranged so as to run substantially parallel to each other. Also, in this embodiment, the longitudinal axis of each groove is oriented at an angle ø (see FIG. 1) with respect to a plane P defined by surface 14a when the surface resides in the first angular orientation (shown in FIG. 1). Angle ø may have any suitable value according to the requirements of a particular application. Alternatively, the longitudinal axis of each groove may be oriented substantially parallel with plane P, in which case the value of angle ø is effectively 0°. In the embodiment shown in FIGS. 1-5, angle ø has a value of approximately 45°. In the embodiment shown in FIGS. 1-5, protrusions 20 and 120 have cross-sections that are substantially cylindrical, although other cross-sectional shapes are possible.

Referring again to FIGS. 1-5, interface 16 also includes at least one substantially circular cavity positioned along each groove and having a center that is offset from the respective groove longitudinal axis. In the embodiment shown in FIGS. 1-5, each of grooves 18 and 118 has respective substantially circular cavities 40-40' and 140-140' positioned at opposite ends of the groove. Each of these cavities has a radius that is substantially equal to a radius of a substantially cylindrical cross-section of a respective one of protrusions 20 and 120. In the embodiments shown in FIGS. 1-5, cavity 40' is offset from axis L and cavity 140' is offset from axis L' in a direction indicated by arrow "E" (FIG. 1). Also, cavity 40 is offset from axis L and cavity 140 is offset from axis L' in a direction indicated by arrow "F" (FIG. 1). However, other offset configurations are possible.

When panel surface 14a resides in either the first angular position (FIG. 1) or the second angular position (FIG. 4), protrusions 20 and 120 will reside within respective ones of cavities 40-40'-140-140'. In this configuration, cavities 40-40'-140-140' act as detents which retard motion of the respective protrusions 20 and 120 away from the ends of the grooves. This provides a level of positional and angular securement of the panel, helping to maintain the panel surface 14a in a desired one of the first and second angular orientations, as shown in FIGS. 1 and 4.

In addition, a bearing surface 22 is operatively coupled to the base portion 12. Referring to FIGS. 1-5, in one particular embodiment, bearing surface 22 is formed by a wall extending from base portion 12 and connecting opposite sides of the base portion. Furthermore, a chamfer at an angle of approximately α degrees (see FIG. 4) with respect to plane P may be formed along an edge of bearing surface 22 as shown in FIG. 4, to provide a flat surface against which panel 14 may rest.

Interface 16 and panel 14 may be constructed such that the panel is removable from the mechanism, for example by deflecting portions of the mechanism onto which the grooves or protrusions are mounted. This enables replacement, interchangeability, and re-use of the panels.

Referring again to FIGS. 1-5, during operation of the mechanism, panel 14 is positioned such that panel first surface 14a initially resides in a first angular orientation shown in FIG. 1. As seen in FIG. 1, when panel first surface 14a is in the first angular orientation, protrusion 20 engages a portion of groove 18, protrusion 120 engages a portion of groove 118, and the panel rests against surface 21. In addition, each of protrusions 20 and 120 resides in a respective one of circular cavities 40, 140.

Referring now to FIG. 2, application of a force to panel 14 in direction "A" forces protrusions 20, 120 out of circular cavities 40 and 140, respectively, and moves the panel in direction "A". As panel 14 moves in direction "A", protrusions 20 and 120 slide along respective ones of grooves 18 and 118, while panel 14 begins to pivot in the direction indicated by arrow "B".

Referring now to FIG. 3, as panel 14 continues to move in direction "A", protrusions 20 and 120 approach the ends of respective ones of grooves 18 and 118, and panel 14 engages a portion of bearing surface 22.

As seen in FIG. 4, by the time protrusions 20 and 120 have reached the ends of respective ones of grooves 18 and 118, the panel now abuts bearing surface 22. At this point, panel first surface 14a resides in the second angular orientation. When panel first surface 14a is in the second angular orientation, protrusion 20 resides within circular cavity 40', protrusion 120 resides within circular cavity 140' and a portion of panel 14 abuts bearing surface 22 to position and maintain first surface 14a in the second orientation. When in the fully extended position the panel will rest at an angle of approximately 45° with respect to a viewing direction, as indicated by arrow "C" (FIG. 4). In other embodiments, the angle between the first panel surface in the second orientation and the viewing direction may be different from 45°, depending on the requirements of a particular application.

In another particular embodiment shown in FIGS. 18a-18f, a single groove 418 is provided in a wall 414b formed on panel 414, and a single protrusion 420 extends from a post 412a formed on a base portion 412. Also, a bearing surface 421 is formed on base portion 412 proximate an end of the base portion.

Figure 18A:
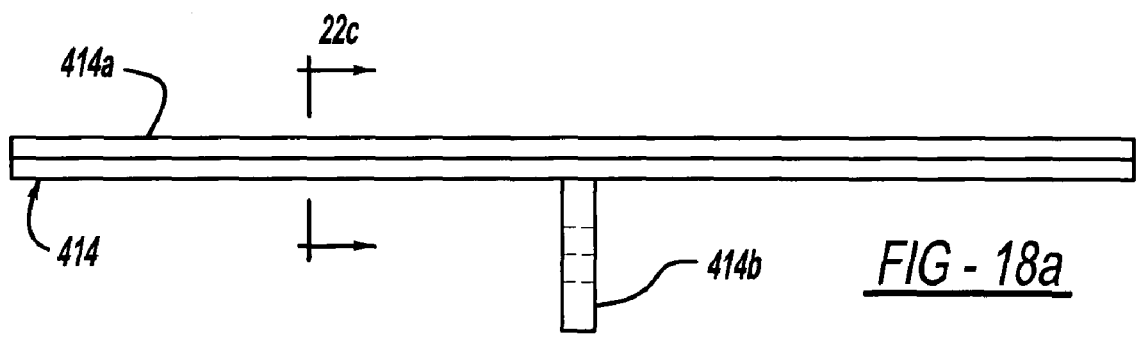
Figure 18B:
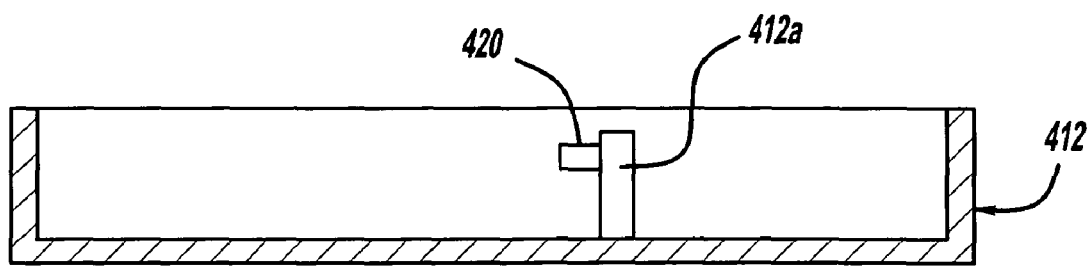
Figure 18C:
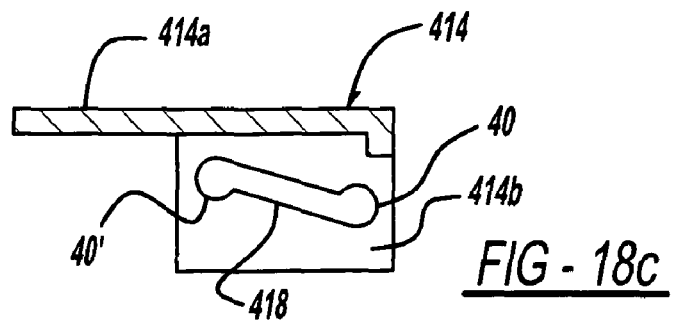

Operation of the embodiment shown in FIGS. 18a-18f is substantially as described above for the embodiment shown in FIGS. 1-5. FIGS. 18e and 18f show partial cross-sectional views of this embodiment in various stages of operation. FIG. 18e shows the information-bearing surface 414a in a first angular orientation, and FIG. 18f shows surface 414a after repositioning and rotation, proximate the desired second angular orientation. During motion of the panel 414 between the first angular orientation and the second angular orientation, the protrusion 420 slidingly engages groove 418 in a manner similar to that shown in FIGS. 1-5. In addition, when rotation of panel 414 in the direction indicated by arrow "G" (FIG. 18f) is complete, a portion of the panel 414 abuts the bearing surface 421 when the first surface of the panel is in the second angular orientation. Bearing surface 421 thus aids in positioning and securing the first surface in the second angular orientation.

Referring again to the embodiment shown in FIGS. 1-5 for illustrative purposes, it will be seen that design factors such as the dimensions and positioning of wall 22, the angle ø of and configurations of grooves 18 and 118, the lengths of the grooves, the configuration and dimensions of panel 14 and other design elements may be varied so as to enable surface 14a to be oriented and secured at any of a variety of desired angles. In addition, the design factors mentioned above may also be specified so as to control the degree to which panel 14 extends below base portion 12 (as represented by dimension "E" in FIG. 4) when panel first surface 14a is oriented in the second angular orientation. This enables the mechanism to be employed in applications where space is restricted. In the embodiment, shown in FIG. 4, the design parameters are specified such that, when the panel first surface 14a is in the second angular orientation, a lowermost portion of panel 14 is substantially coplanar with (or does not extend below) a plane P2 defined by a lowermost part of base portion 12.

In the second angular orientation shown in FIG. 4, the full area of panel first surface 14a is visible to a user viewing the case edge on, in the direction indicated by arrow "C" which is the same direction from which a user would view the spine label area. This area of the panel first surface 14a is much larger than the spine label area and provides a much greater surface on which to apply information.

In one particular embodiment (not shown), one of first groove 18 and second groove 118 is positioned on base portion 12, and the other one of first groove 18 and second groove 118 is positioned on panel 14. Protrusions 20 and 120 are correspondingly positioned on base portion 12 and panel 14 so as to slidingly engage respective ones of grooves 18 and 118 as previously described. Alternatively, both first groove 18 and second groove 118 may be positioned on the base portion 12, or both first groove 18 and second groove 118 may be positioned on the panel 14.

In another particular embodiment (not shown), the first protrusion 20 is positioned on a first piece formed separately from the base portion 12, the second protrusion 120 is positioned on a second piece formed separately from the base portion 12, and the first and second pieces are coupled to the base portion 12.

In yet another particular embodiment (not shown), the first groove 18 is positioned on a first piece formed separately from the base portion 12, the second groove 118 is positioned on a second piece formed separately from the base portion 12, and the first and second pieces are coupled to the base portion 12

In yet another particular embodiment (not shown), both the first groove 18 and the second groove 118 are positioned on a single piece formed separately from the base portion 12, and the separate piece is coupled to the base portion.

In yet another particular embodiment (not shown), the first protrusion 20 and the second protrusion 120 are both positioned on a piece formed separately from base portion 12 and the separate piece is then coupled to base portion 12.

Referring to FIG. 6, in yet another embodiment, the interface connects panel 14 to the base portion such that the panel first surface 14a is positionable and maintainable in a third angular orientation different from the first angular orientation and the second angular orientation. In the embodiment shown in FIG. 6, the third angular orientation is achieved by turning the mechanism over such that panel 14 hangs suspended from grooves 18 and 118 via protrusions 20 and 120. This enables a second surface 14b of the panel opposite first surface 14a to be utilized for positioning and display of information thereon, if so desired. The force of gravity acting on panel 14 when the panel is inverted may act to maintain the panel in the third orientation.

Referring to FIG. 7, a mechanism in accordance with an embodiment described herein may be fabricated as a separate assembly, rather than being incorporated into another part. In this embodiment, base portion 12 is formed as a separate part and panel 14 is coupled to the base portion using an interface 16 in accordance with an embodiment of the present invention. In this embodiment, base portion 12 includes a mounting surface 12a by which mechanism 10 can be attached to an object (not shown), such as a storage bin or other container. Information applied to first panel surface 14a may then be used to identify the contents of the container to which mechanism 10 is attached. Base portion 12 may be attached to an object using any of a variety of methods, such as magnetic or adhesive attachment.

The size of the panel surface area used for application of information thereon will depend on such factors as how the panel surface is to be incorporated into the object in question, the dimensions of the space envelope available to the object, visibility requirements for the information positioned on the panel surface, and various other factors.

Referring now to FIGS. 8-12, in one particular application, a mechanism in accordance with an embodiment of the present invention is coupled to a case used for holding, protecting and identifying an information storage media or digital storage media, such as compact discs, digital videodiscs, and mini-discs. Such cases have been in existence in various designs since the "disc" format came into public use, and are well-known in the art.

As is known in the art, the basic case design incorporates a tray base 101, into which is placed a disc tray for the purpose of holding the disc. A pair of ears 102, 103 extend from the main portion of the tray base, permitting a cover 200 to be rotatably connected to the ears via pins or protrusions extending into complementary holes or cavities formed in the ears. The cover may then pivot with respect to the tray base 101 to enclose the disc. A plastic strip (not shown) is usually is affixed to an edge of the case and extends between ears 102, 103. The strip occupies a space between ears 102, 103, and between an edge of the case and an edge of the case cover. The case also has a "spine label" area (generally designated 105) along which information identifying the disc and/or its contents may be placed.

Figure 12:
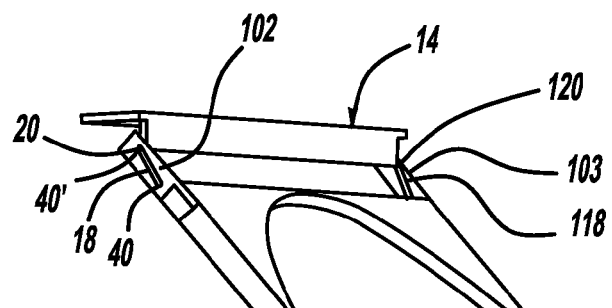
FIG. 12 is a perspective view of the case and the embodiment of the mechanism shown in FIGS. 8-11.
Figure 13:
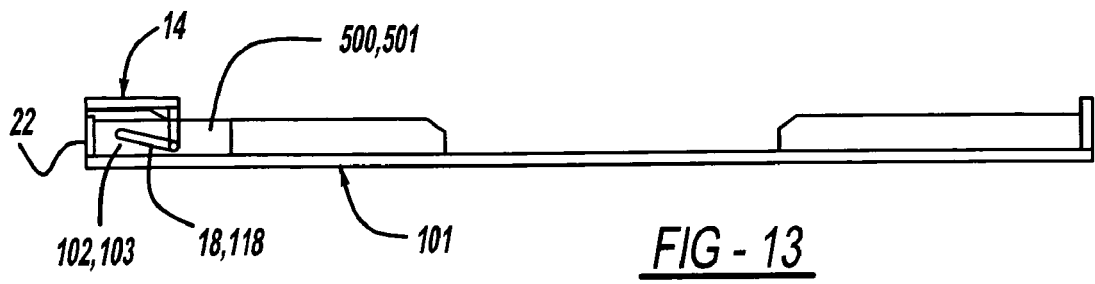
FIGS. 13-14 are side views of the structure and operation of another embodiment of a mechanism for enabling application of information to an object, incorporated into a case for receiving a digital storage medium therein.
Figure 14:
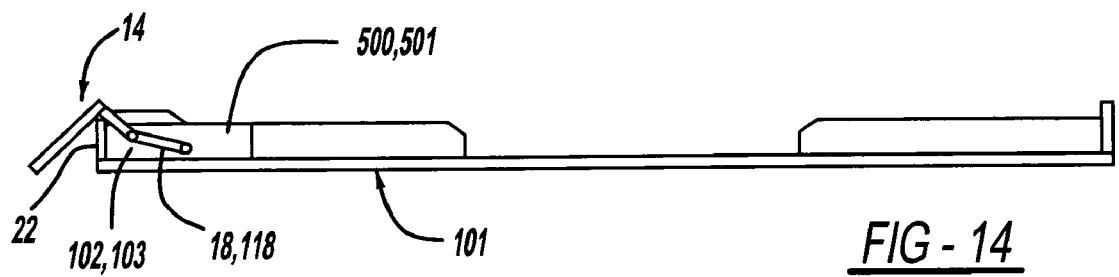

Grooves as previously described are either formed into ears 102, 103 during molding and fabrication of the cases (as seen in the embodiment of FIGS. 8-12) or formed into separate pieces 500, 501 attached to the ears (as shown in the embodiment in FIGS. 13-14). Likewise, protrusions 20, 120 are formed on panel 14. Formation of the mechanism elements into separate parts allows the embodiments of the mechanism described herein to be retrofitted onto existing media cases, without changing the overall dimensions of the existing case.

Referring again to FIGS. 8-12, panel 14 extends adjacent to an edge of the case, in the position occupied by the plastic strip in the conventional case design described above. Because the area occupied by the strip is much greater than the area of the case spine portion, and because the strip is displaced by a portion of the panel including the first panel surface 14a on which information is placed, use of the panel surface greatly increases the area available for application of information thereon. Incorporation of an embodiment of the mechanism of the present invention into such an existing media storage case design can provide a surface area for application of information thereon which is more than twice the size of the stationary surface along the spine label area currently used for content identification.

A bearing surface 22 as previously described is formed by the spine edge of the case. This bearing surface may be dimensioned so as to accommodate sliding motion of the panel therealong, or a clearance "G" (see FIG. 8) may be provided between the panel and the bearing surface prior to movement of the panel to the second angular orientation to facilitate rotation of the panel surface 14a to the second angular orientation.

Operation of the mechanism shown in FIGS. 8-12 to move surface 14a between the first and second angular orientations is as previously described with regard to FIGS. 1-5. The panel surface 14a resides in the first angular orientation in FIG. 8. FIGS. 8-12 show progressive movement of panel 14 in the general direction indicated by arrow "A". In FIG. 12, protrusions 20, 120 have reached the ends of grooves 18, 118, the panel 14 rests against bearing surface 22, and panel first surface 14a is positioned and secured in the desired second angular orientation. In addition, protrusions 20 and 120 reside in respective ones of circular cavities 40', 140'.

It may also be seen that the lowermost point to which the hanging portion of the panel extends when in the second angular orientation can be controlled as previously described, such that the panel is substantially coplanar with (or does not extend below) a lowermost face 101a of the tray base. In addition, the dimensions and configuration of the mechanism elements may be controlled such that the uppermost portion of the panel in the second angular orientation is substantially coplanar with an upper or outer face 200a of the CD case. In this manner, the panel may be made to reside substantially within the existing height envelope of a conventional CD case when the panel is in the second angular orientation, thereby enabling stacking of multiple CD cases, each with a panel in an extended position (i.e., in the second angular orientation).

FIGS. 13-14 show an embodiment of the CD case in which the elements of mechanism 10 are retrofitted onto an existing storage case. Base portion 12 is formed at an end of the case by forming grooves into separate parts 500 and 501 as previously described. These parts are then secured to ears 102, 103 of the tray base 101, and panel 14 containing protrusions 20 and 120 is coupled to the base portion by inserting the protrusions into corresponding ones of opposed grooves 18 and 118, as previously described. FIG. 13 shows panel 14 in the first angular orientation, and FIG. 14 shows panel 14 in the second angular orientation. Operation of the mechanism shown in FIGS. 13-14 to move surface 14a between the first and second angular orientations is as previously described with regard to FIGS. 8-12.

Existing case designs have a spine wall 22 which may act as a bearing surface when protrusions 20 and 120 are secured to base portion 12 at the ends of grooves 18, 118. The panel configuration may be adapted to facilitate hanging of a portion of the panel over the wall. Alternatively, existing case tooling may be modified to change the dimensions and/or configuration of the spine wall as molded, to operate in conjunction with grooves 18, 118 and protrusions 20, 120 to support the first panel surface in the desired second angular orientation.

Figure 15A:
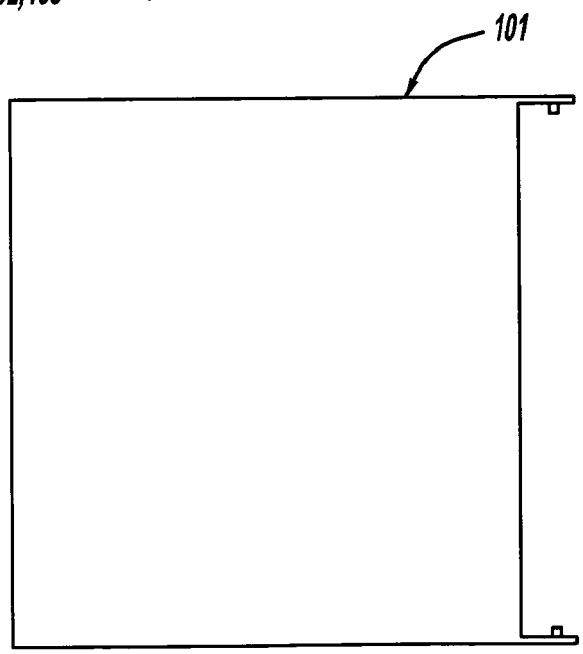
FIGS. 15A-15C show elements of another embodiment of a mechanism for enabling application of information to an object, incorporated into another type of case for receiving a digital storage medium therein.
Figure 15B:
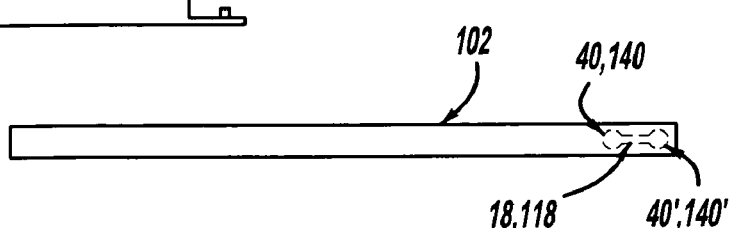
Figure 15C:
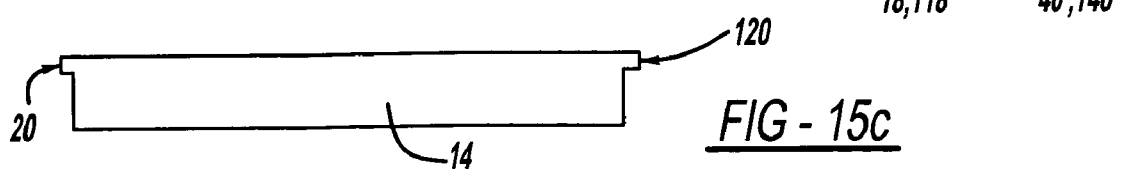

Referring now to FIGS. 15A-15C, an application of an embodiment of the present invention to a mini-disc case is shown. The mini-disc case generally includes a cover 101 and a bottom 102. The mini disc itself rests on an impression (not shown) that is molded or otherwise formed on case bottom 102. The cover of the case pivots to open and close over the bottom, thereby exposing or enclosing the mini-disc. Generally, due to the case design and small size, mini-disc containers do not have the spine label area included on larger cases. Thus, information is usually applied to the cover, and each case must be handled by a user to determine the disc contents. In the embodiment shown in FIGS. 15A-15B, the movable panel 14 is located along an edge of the case, as previously described.

As described in the previous embodiments, a network of opposed grooves 18, 118 and protrusions 20, 120 is provided to guide the panel between the first and second positions, and to help secure the panel between the first and second positions. In the embodiment shown in FIGS. 15A-15B, grooves 18, 118 are formed in the case bottom, and complementary protrusions are formed in panel 14. Grooves 18, 118 in FIGS. 15A-15B also include circular cavities 40, 40' 140, and 140' as previously described, to aid in retaining the panel in the first and second positions. Due to the relatively small size of the mini-disc case, the angle $\emptyset$ between first surface 14a in the first panel position (shown in FIG. 16) and the first surface in the second panel position (shown in FIG. 17) may be less than corresponding angles in the full-size media cases previously described. In one embodiment, angle $\emptyset$ is approximately 20°.

Figure 16:
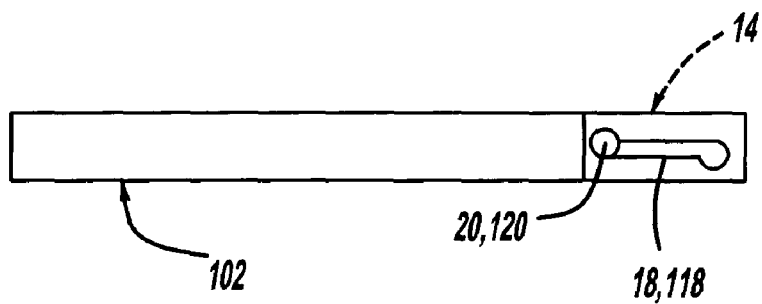
FIGS. 16 and 17 are side views showing the operation of the embodiment of the mechanism shown in FIGS. 15A-15C.
Figure 17:
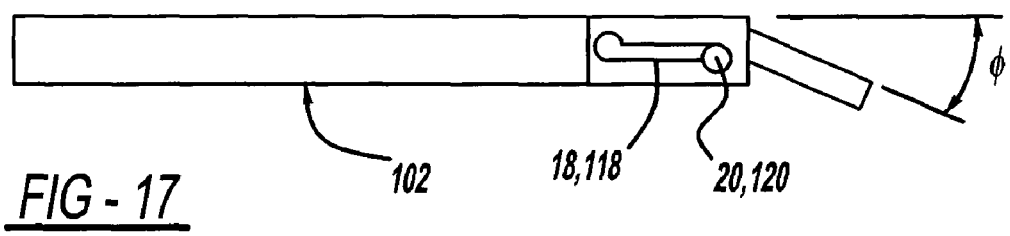

Operation of the mechanism shown in FIGS. 15A-15C to move surface 14a between the first and second positions is as previously described. In FIG. 16, the panel surface 14a resides in the first position. FIGS. 16-17 show progressive movement of panel 14 in the general direction indicated by arrow "A". In FIG. 17, protrusions 20, 120 have reached the ends of grooves 18, 118, the panel is fully extended, in its second securement position.

As the panel remains in substantially the same angular orientation in both the first and second positions, extension of the panel does not interfere with panels extending from cases which are stacked on top of (or beneath) the panel in question. If desired, the dimensions and/or configuration of bearing surface 22 may be adjusted so as to permit the panel to extend at an angle with respect to a plane P defined by first surface 14a in its first position, as previously described.

Use of the movable panel as described above enables content information to be applied to a portion (i.e., the panel) of the case which has a relatively large surface area, permitting large printing or lettering to be used to increase the visibility of the applied information. In addition, the panel can be positioned to enable a user to read the information when multiple mini-disc cases are stacked.

The embodiments of the mechanism described herein enable objects incorporating the mechanism to be stacked or positioned side-by-side with the movable panel extended, without interfering with adjacent containers residing above, below or to the side. In addition, the panels (or any other element of the mechanism) may be manufactured in a variety of different colors. This permits the contents of a container incorporating the mechanism to be identified by color.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. An improved case for storing a digital disc, the case having:
   a tray base (101) including a portion structured for holding a disc therein, an exterior surface (101a) of the tray base (101) defining a first exterior face of the case;
   a cover (200) movably connected to the tray base and movable between a first orientation covering the disc-holding portion, and a second orientation exposing the disc-holding portion, the first cover orientation defining a closed condition of the case in which access to the disc-holding portion is blocked; and
   a spine wall (22) extending along an edge of the case, the spine wall (22) having a first side (105) facing away from the case, the first side having a surface area;
   wherein the improvement comprises a panel (14), the panel (14) having a first surface (14a) facing away from the case, the first surface (14a) having a surface area greater than the surface area of the spine wall first side (105), the panel (14) being movably coupled to the tray base (101), and wherein, when the case is in the closed condition, the panel (14) is movable from a first angular orientation to a angular second orientation different from the first angular orientation and from the second angular orientation to the first angular orientation while the case remains in the closed condition.

2. The case of claim 1 wherein the panel (14) is structured such that, when in the second angular orientation, the panel is supported by an edge of the spine wall (22) such that the panel first surface (14a) extends from the edge of the spine wall (22) to the first side of the spine wall (22), toward a plane (101a) defined by the first exterior face (101a) of the case and at an angle with respect to the spine wall first side (105).

3. The case of claim 1 wherein the improvement further comprises at least one protrusion (20, 120) extending from the panel (14), and at least one straight groove (18, 118) formed in the tray base (101), the at least one groove (18, 118) having opposed first and second longitudinal sides structured to receive the at least one protrusion (20, 120) therebetween for guiding a motion of the at least one protrusion (20, 120) along the at least one groove (18, 118).

4. The case of claim 3 wherein the at least one groove (18, 118) extends at an angle with respect to the first exterior face (101a) of the case.

5. The case of claim 3 wherein the at least one groove (18, 118) is positioned between the first side of the spine wall 22 and the disc-holding portion.

6. The case of claim 3 wherein the improvement further comprises a first cavity (40,140) extending into the first side of the at least one groove (18, 118), and a second cavity (40',140') extending into the second side of the at least one groove.

7. The case of claim 1 wherein a difference between the first angular orientation and the second angular orientation is 45 degrees.

8. The case of claim 6 wherein the first cavity (40, 140) is circular and wherein the first cavity (40, 140) has a center that is offset in a first direction from a longitudinal axis of the at least one groove (18, 118).

9. The case of claim 6 wherein the first cavity 40 is positioned at a first end of the at least one groove 18 and wherein the second cavity 40' is positioned at a second end of the at least one groove 18.

10. The case of claim 6 wherein, when the panel first surface (14a) is in the second angular orientation, the at least one protrusion (20, 120) resides within the second cavity (40', 140').

11. The case of claim 10 wherein when the panel first surface 14a is in the first angular orientation, the at least one protrusion (20, 120) resides within the first cavity (40, 140).

12. The case of claim 10 wherein the at least one protrusion (20, 120) is extracted from the second cavity (40', 140') to position the at least one protrusion (20, 120) completely within the at least one groove (18, 118), to enable motion of the at least one protrusion (20, 120) along the at least one groove (18, 118).

13. The case of claim 1 wherein a difference between the first angular orientation and the second angular orientation is less than 90 degrees.

14. The case of claim 1 wherein the panel is a part separate from the tray base and from the cover.

15. An improved case for storing a digital disc, the case having:
a tray base (101) including a portion structured for holding a disc therein, an exterior surface (101a) of the tray base (101) defining a first exterior face of the case;
a cover (200) movably connected to the tray base (101) and movable between a first orientation covering the tray base disc-holding portion, and a second orientation exposing the disc-holding portion, the first cover orientation defining a closed condition of the case;
a spine wall (22) extending along an edge of the case, the spine wall (22) having a first side (105) facing away from the case, the first side (105) having a surface area;
wherein the improvement comprises a panel (14) separate from the cover (200) and separate from the tray base (101), the panel (14) having a first surface (14a) facing away from the case, the first surface (14a) having a surface area greater than the surface area of the spine wall first side (105), the panel (14) being movably coupled to the tray base (101) such that the panel first surface (105) is maintainable in a first angular orientation and in a second angular orientation different from the first angular orientation,
the panel (14) being structured such that, when the panel first surface (14a) is in the second angular orientation, the panel (15) is supported by an edge of the spine wall (22) such that the panel first surface (14a) extends from the edge of the spine wall (22) along the first side (105) of the spine wall (22), toward a plane (P2) defined by the first exterior face (101a) of the case and at an angle with respect to the spine wall first side (105).

16. The case of claim 15 wherein a difference between the first angular orientation and the second angular orientation is less than 90 degrees.

17. An improved case for storing a digital disc, the case having:
a tray base (101) including a portion structured for holding a disc therein, an exterior surface (101a) of the base defining a first exterior face of the case;
a cover (200) movably connected to the tray base (101) and movable between a first orientation covering the disc-holding portion, and a second orientation exposing the disc-holding portion, the first cover orientation defining a closed of the case, an exterior surface (200a) of the cover (200) defining a second exterior face of the case extending opposite the first exterior face, the second exterior face extending parallel to the first exterior face when the cover is in the first orientation;
a spine wall (22) extending along an edge of the case, the spine wall (22) having a first side (105) facing away from the case, the first side (105) having a surface area;
wherein the improvement comprises a panel (14) separate from the cover (200) and separate from the tray base (101), the panel (14) having a first surface (14a) facing away from the case, the first surface (14a) having a surface area greater than the surface area of the spine wall first side (105), the panel (14) being movably coupled to the tray base (101), such that the panel first surface (14a) is maintainable in a first angular orientation and in a second angular orientation different from the first angular orientation, the panel (14a) being structured such that, when the panel (14) is in the first angular orientation, the panel (14) extends between a plane (P2) defined by the first exterior face (101a) and a plane defined by the second exterior face (200a), and the panel does not extend beyond the plane defined by the first exterior face (101a) or the plane defined by the second exterior face (200a); and
such that when the panel (14) is in the second angular orientation, the panel (14) extends between the plane (P2) defined by the first exterior face (101a) and the plane defined by the second exterior face (200a) and the panel (14) does not extend beyond the plane (P2) defined by the first exterior face (101a) or the plane defined by the second exterior face (200a).

18. The case of claim 17 wherein the panel (14) comprises a first portion containing the panel first surface (14a), a second portion extending from the first portion, and a protrusion (20, 120) extending from the second portion and structured to engage a groove (18, 180) in the tray base (101), wherein the panel (14) is structured so that, when the panel (14) is in the first angular orientation, the panel first portion extends parallel to the first exterior face (101a) of the case and the panel second portion extends parallel to the spine wall (22).

19. The case of claim 17 wherein a difference between the first angular orientation and the second angular orientation is 45 degrees.

20. The case of claim 17 wherein a difference between the first angular orientation and the second angular orientation is less than 90 degrees.

* * * * *